United States Patent [19]
Chambu et al.

[11] 3,771,879
[45] Nov. 13, 1973

[54] PROCESS AND APPARATUS FOR MEASURING TRANSPARENCY

[75] Inventors: Claude Chambu, Billere; Jean-Paul Collo, Denguin, both of France

[73] Assignee: Societe Anonyme dite: Societe National Des Petroles D'Aquitaine, Paris, France

[22] Filed: Nov. 16, 1971

[21] Appl. No.: 199,198

[30] Foreign Application Priority Data
Nov. 16, 1970 France.......................... 7041020

[52] U.S. Cl. ................................. 356/201, 356/124
[51] Int. Cl. ........................................... G01n 21/06
[58] Field of Search.................... 356/124, 127, 201, 356/239, 240

[56] References Cited
UNITED STATES PATENTS

| | | | |
|---|---|---|---|
| 2,771,004 | 11/1956 | Sachtleben.......................... | 356/124 |
| 3,438,713 | 4/1969 | Heynacher et al.................. | 356/124 |
| 3,193,690 | 7/1965 | Murata et al. ..................... | 356/124 |

FOREIGN PATENTS OR APPLICATIONS

| | | | |
|---|---|---|---|
| 1,042,715 | 9/1966 | Great Britain....................... | 356/124 |
| 1,251,976 | 10/1967 | Germany ............................ | 356/124 |

OTHER PUBLICATIONS
Parker et al. "An Apparatus for Aperture-Response Testing...Optical Systems" J. Soc. M.P.T.E. Vol. 61, pp. 721–730, Dec. 1953.

*Primary Examiner*—Ronald L. Wibert
*Attorney*—Joseph F. Brisebois et al.

[57] ABSTRACT

Existing processes for testing the transparency of various materials involve observing patterns formed of series of black lines on a white background, through a sample of the material concerned.

The present invention consists of lighting tee sample with a parallel light beam from collimator, receiving the beam transmitted by the sample on an optical system which is coaxial wth the collimator and forming an image of the slit in the collimator on a sinusoidal pattern which is moving in relation to the collimator, measuring the luminous flux transmitted by the pattern, and working out the factor of contrast, from the maximum and minimum flux transmitted.

16 Claims, 6 Drawing Figures

PROCESS AND APPARATUS FOR MEASURING TRANSPARENCY

The invention concerns an improved process and apparatus for measuring the transparency of plastic films or similar products, liquids or glass.

This invention concerns an improved process and apparatus for measuring the transparency of various materials.

In particular, it concerns measurement of the transparency of plastic films, sheets and similar products, notably those made of polyethylene, by determining the factor of contrast.

Existing methods of measuring transparency consist of observing patterns, formed of series of black lines on a white background, through the film being tested. The patterns are numbered, and differ from one another in the distance between the lines, which is around one millimetre. The material being tested is classified by the number of the last pattern in which the tester's eye can distinguish the separate lines.

Existing optical processes are also based on the fact that an optical object can be represented by an infinity of sinusoidal distributions of illumination in the object plane. This leads to components presenting various spatial frequencies (number of lines per millimetre), and thus for each of them to a transmission factor which depends on this spatial frequency.

In practice, these methods, involving measurement of the modulation transfer factor, are based on the fact that the spatial frequency transmission spectrum is characteristic of the transparency of the system being measured.

Briefly, a perfectly transparent material transmits all the spatial frequencies contained in a light beam, without attenuation, whereas an imperfectly transparent one attenuates the spatial frequencies in the light beam unequally.

The process and apparatus according to the present invention consist of improvements to the existing process and apparatus for testing optical systems. They make it possible to measure the transparency of films and sheets of materials which are anisotropic, something that was not possible with earlier processes and apparatuses. They also allow the transparency to be determined statistically.

The present invention concerns a process for measuring the transparency of a sample of material by determining the factor of contrast, characterized by the fact that the sample is lit by a parallel light beam from a collimator, the light beam transmitted by the sample is received on an optical system which is coaxial with the collimator, forming the image of the collimator slit on a sinusoidal pattern which moves in relation to the collimator, the luminous flux transmitted by the pattern is measured, and the factor of contrast is worked out from the minimum and maximum flux transmitted.

The factor of contrast is expressed by the equation $$C \% = (M - m/M + m) \times 100$$

where $M$ is the maximum flux transmitted and $m$ the minimum flux, this factor of contrast corresponding to the transparency of the sample.

According to one embodiment of the process according to the invention, the sample rotates round an axis parallel to the optical axis, or moves in translation at right angles to this axis.

According to another embodiment of the process, the sample is submerged in a liquid with the same refractive index as it, so as to remove any surface effects.

According to one feature of the process according to the invention, the axis of symmetry of the pattern sinusoids is at right angles to the optical axis referred to.

The pattern must allow transmission in a perfectly sinusoidal form.

According to another feature of the process, a pattern with several spatial frequencies, varying continuously or intermittently, is used. In this way a measurement programme can be set up.

In one embodiment of the invention, the luminous flux transmitted by the pattern is received in a photo-receiver, the output signal from which is amplified and recorded continuously throughout the testing period.

In another embodiment of the invention, the fact or of contrast is worked out continuously from the photo-receiver output signal, using an analogue computer, and is displayed and/or printed out during the testing period.

The invention also concerns any apparatus for carrying out the process according to the present invention.

In particular, it concerns an apparatus for measuring the transparency of a sample of material, consisting of a collimator, a sample-holder between this collimator and an optical system with the same optical axis as the collimator, a sinusoidal transmission pattern on which is formed the image of the collimator slit through the optical system, and which moves in relation to the collimator, a photo-receiver to measure the luminous flux transmitted by the pattern, and a unit to process the signals supplied by the photo-receiver and work out the factor of contrast.

According to one embodiment of the apparatus according to the invention, the sample-holder contains a cavity for the sample which can be made to rotate round an axis parallel to the optical axis, by means of a driving device and motor-reducing gear.

According to another embodiment of the apparatus according to the invention, the said cavity in the sample-holder is airtight, and contains a liquid with the same refractive index as the sample being tested.

In one embodiment of the apparatus, the photo-receiver is a photomultiplier, combined with a recording system.

In another embodiment of the apparatus, the photo-detector is a photodiode, and the unit to process the signals supplied by it contains an amplifier combined with an analogue computer to work out the factor of contrast, which is transmitted to a display unit and/or printer.

This invention also concerns an apparatus to measure a function of the type $(M-m)/(M+m)$, where $M$ and $m$ are the successive maximum and minimum of a function respectively, characterized by the fact that it contains a storage system including a differential amplifier which loads a capacity through a diode controlled by a high-impedance follower differential amplifier which, by counter-reaction, returns the data received to the first amplifier.

According to one embodiment of the apparatus, the storage system contains a synchronization device which can reduce the stored voltage to nought.

The invention also concerns an apparatus to measure a function of the type $(M-m)/(M+m)$, where $M$ and $m$ are the successive maximum and minimum of a function respectively, containing an analogue computer with a storage device receiving the signal from the amplifier combined with the computer and supplying a signal representing the maximum $M$ of the signal from this amplifier, a second storage device receiving the signals from the first one and from the amplifier combined with the computer and supplying a signal representing the difference $(M - m)$ between the maximum and minimum of the signal supplied by this amplifier, an amplifier duplicating the signal from the first storage device, a differential amplifier receiving the signals from the amplifier with a gain of 2 and from the second storage device, and producing a signal equal to their difference, and an analogue divider producing an output signal equal to the quotient of the signal from the second storage device by the signal from the differential amplifier, this signal from the divider representing the ratio $(M - m)/(M + m)$.

The process and apparatus according to the invention are particularly suitable for measuring the transparency of materials in the form of films, sheets or plates, such as glass, plastics, or liquids.

The following detailed description, and the accompanying figures will show other purposes and advantages of the invention, by presenting several embodiments of it; the invention is by no means confined to them, however.

Figure 1:
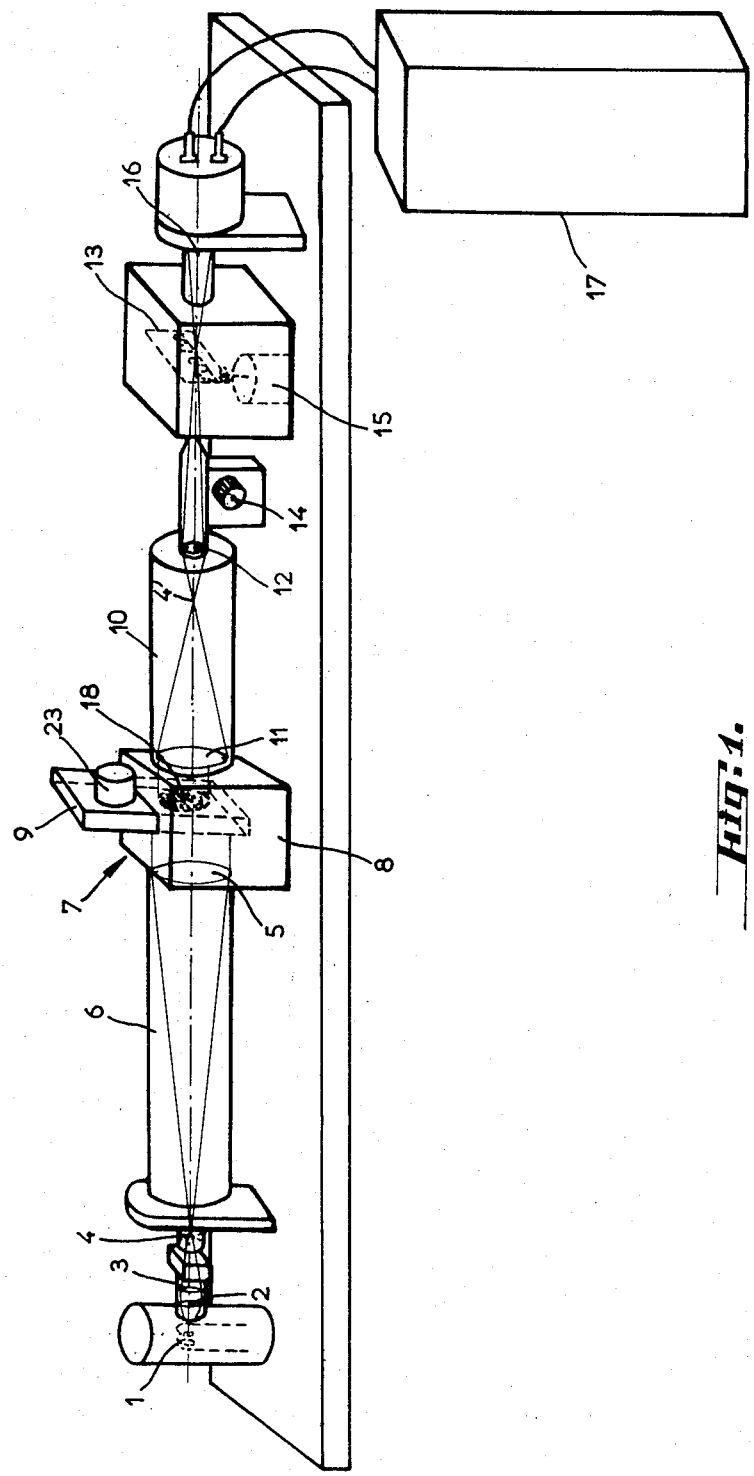
FIG. 1 shows an apparatus corresponding to the present invention, for measuring transparency.

In FIG. 1, a filament (1) provides a light source. Lenses (2 and 3) form the image of the filament on a vertical slit (4), placed at the focus of a lens (5) giving parallel light. The light source (1), the lenses (2, 3 and 5) and the slit (4) form the collimator (6).

A sample-holder (7), consisting of a bracket (8) and sample-holder device (9), is placed between the collimator (6) and an optical system (10), consisting of a lens (11), giving an image (4') of the slit (4) at its focus, and including an objective (12) giving an image of 4' on a pattern device (13). An objective-adjusting system (14) is provided.

The pattern (13) is horizontal, and is moved by means of a driving motor (15); this movement is horizontal.

A photo-receiver (16) measures the luminous flux passing through the pattern device and supplies a signal to the processing unit (17), which processes this signal and allows the factor of contrast to be worked out.

The actual sample-holder (9) contains a recess in which the sample (18) is held fixed by any suitable means. This recess may be made to rotate round its axis, and rests on rollers. A driving system with a motor (23) produces this rotary movement.

This apparatus operates as follows.

The light beam from the collimator (6) passes through the sample (18), and the image of the slit (4) of the collimator is formed on the pattern (13), which transmits part of the light to the photo-receiver (16).

If there is no object to absorb the spatial frequency of the pattern, the photo-receiver gives an electrical signal reproducing the sinusoid when the pattern moves at right angles to the optical axis, along a horizontal axis.

If an object is interposed (a polyethylene film) absorbing the pattern frequency, the sinusoid given by the photo-receiver is flattened. The reduction in amplitude allows the attenuation factor to be calculated.

The pattern used may be, for instance, the juxtaposition of four patterns with increasing spatial frequencies, of 0.1, 0.4, 0.6 and 0.8 $mm^{-1}$. There are serious difficulties in obtaining patterns of higher frequency. These frequencies are obtained by making an image $M'$ reduced ten times by the objective 12 in the 4' image plane of the input slit 4, also reduced 3 times by the lenses 5 and 11. The sample is placed in the parallel beam between 5 and 11. The effective part is a 1.5 cm-radius circle, which can revolve at a speed of 50 rps. The recording system, with a 1-second period, acts as an integrator.

Figure 2:
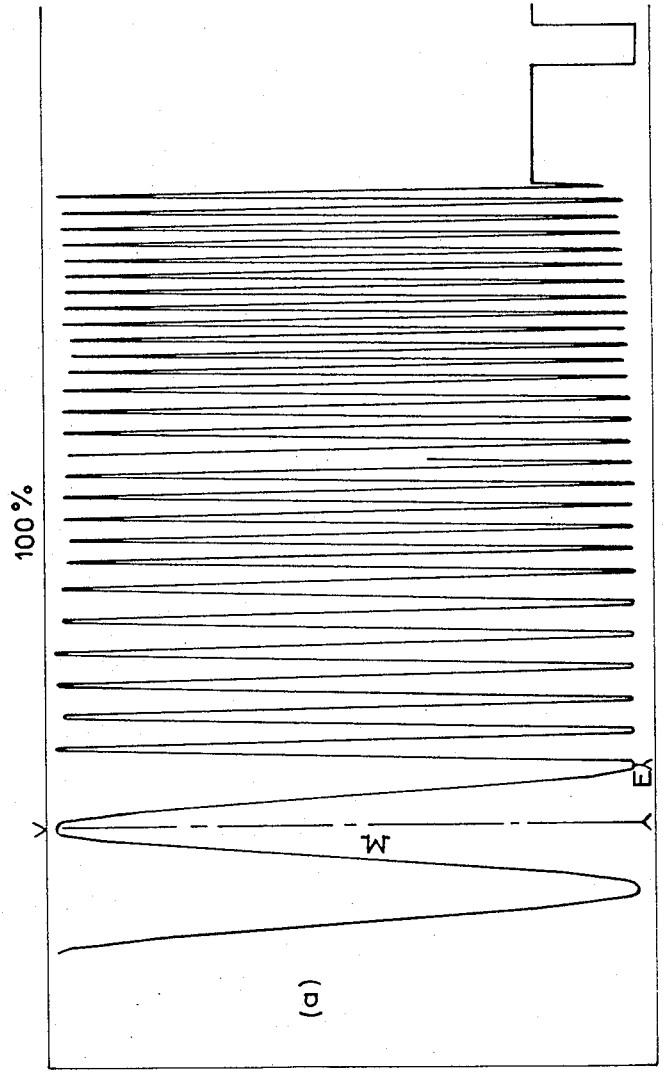
FIGS. 2 and 3 show the results recorded, without and then with a polyethylene film interposed.

FIG. 2 shows results recorded without any film interposed.

The factor of contrast is close to 1, regardless of the frequency, because $M$ remains close to 100 percent and $m$ close to 0 percent.

Figure 3:
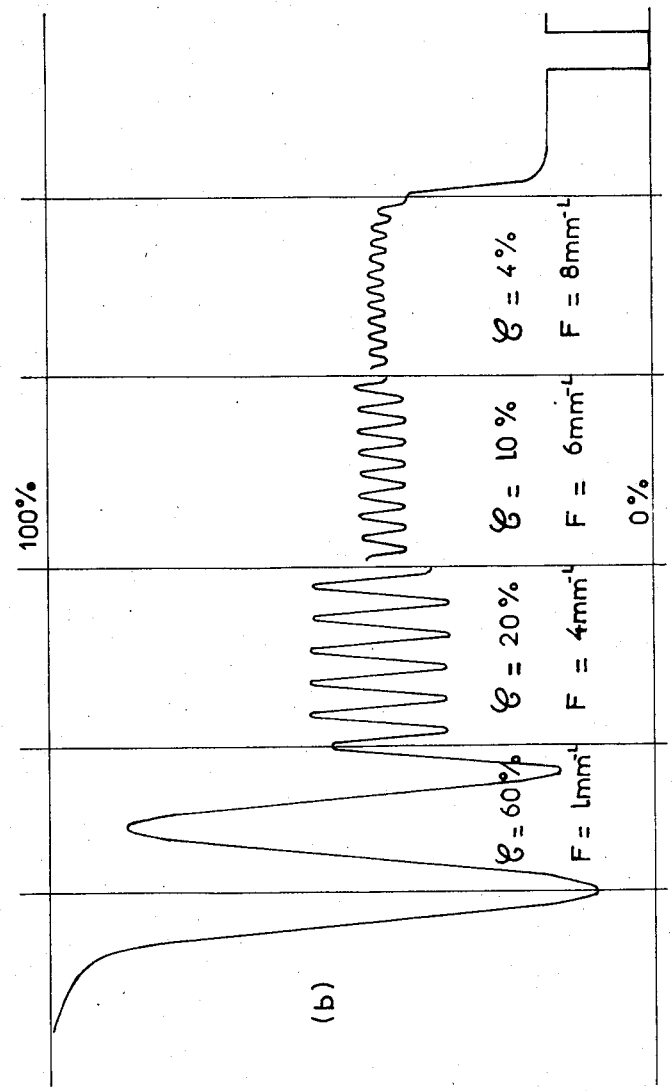

If a fairly opaque film is interposed, the results shown in FIG. 3 are obtained. When the frequency increases, the value of $M$ decreases (85 – 60 – 55 – 52 percent), and that of $m$ simultaneously increases (15 – 40 – 45 – 48 percent), so that the contrast drops from 60 to 4 percent.

Figure 4:
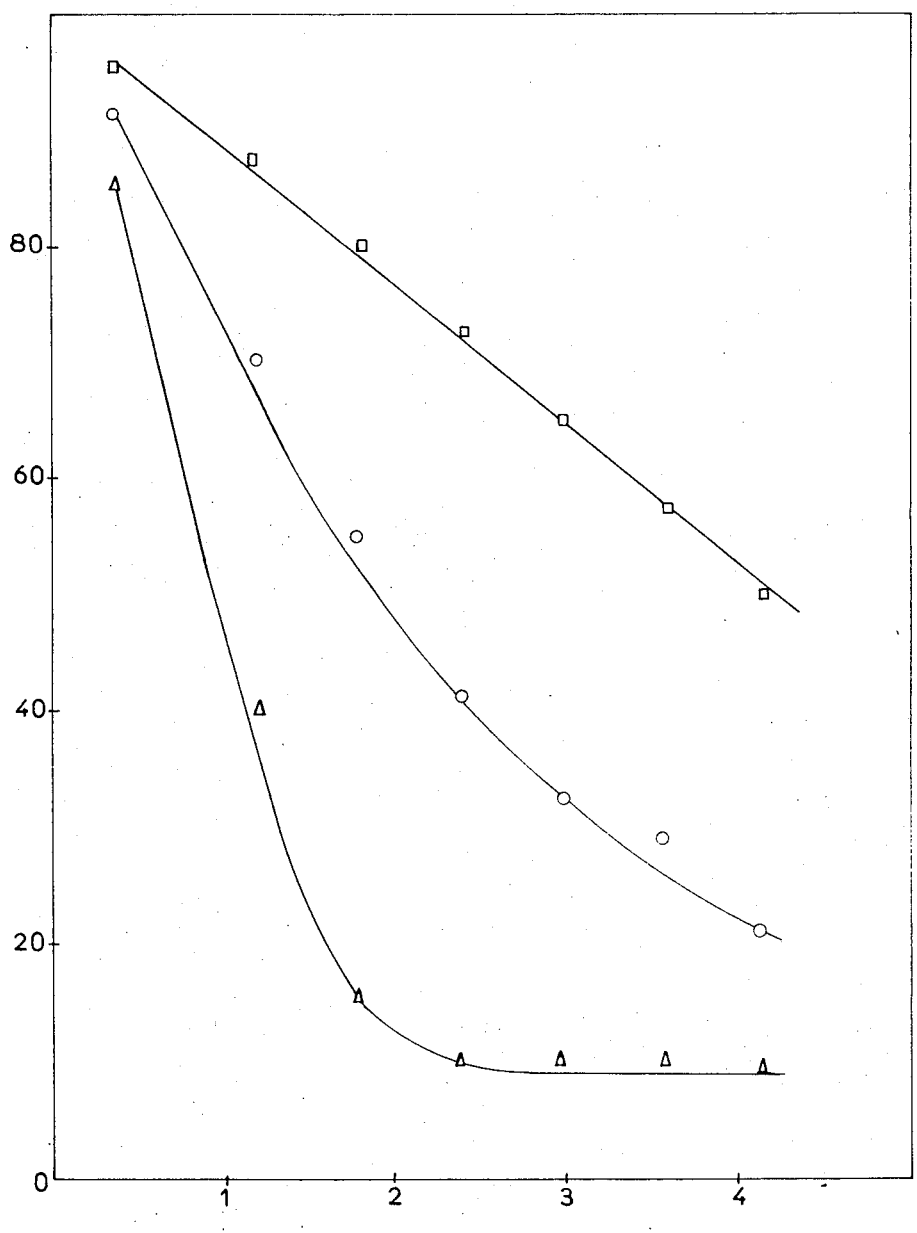
FIG. 4 shows the effect of the position of the sample on the percent factor of contrast.

Industrial films are streaked and highly anisotropic, as may be seen in FIG. 4. If the streaks are perpendicular to the slit, the image on the pattern is narrow, and the contrast remains good, whatever the frequency (95 to 50 percent). But if they are parallel to the slit, its image becomes diffused and the contrast quickly drops to 10 percent. The median curve relates to a revolving sample. It integrates the anisotropic effects, and is the one chosen to classify industrial products.

Figure 5:
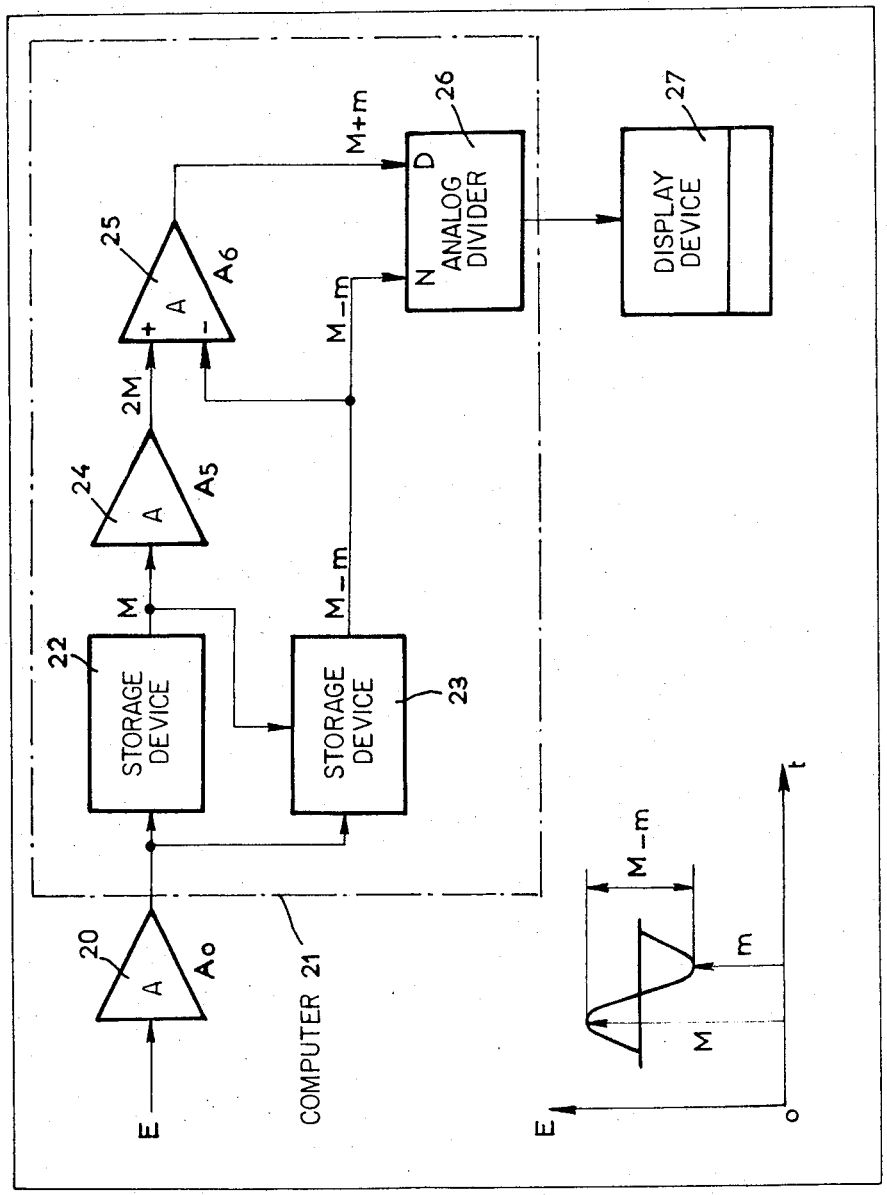
FIG. 5 shows a general diagram of the unit to process the signals supplied by the photo-receiver, for continuous calculation of the factor of contrast.

The processing unit shown diagrammatically in FIG. 5 works out the factor of contrast continuously, from signals supplied by the photo-receiver.

This unit consists of an amplifier (20), an analogue computer (21) combined with this amplifier and containing a storage device (22) receiving the signal from 20 and supplying a signal representing the maximum value of the signal from 20, a second storage device (23) receiving the signals from 20 and 22, and supplying a signal representing the difference between the maximum and minimum values of the signal from 20, an amplifier (24) duplicating the signal from 22, a differential amplifier (25) supplying a signal equal to the difference between the signals from 24 and 23, and an analogue divider to divide the signal from 23 by the signal from 26, and a display system and/or printer receiving from the computer the signal produced by the analogue divider, which is representative of the factor of contrast.

Figure 6:
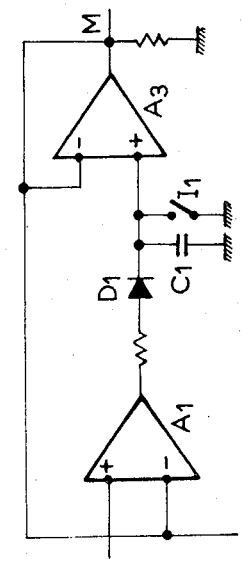
FIG. 6 shows a general diagram of a storage device corresponding to the invention.

FIG. 6 shows a general diagram of a storage device, in which a differential amplifier $A_1$ receiving a maximum input signal (+) sends this signal through a diode $D_1$ to a capacitor $C_1$. This capacitor is loaded up to a maximum $M$, which is taken over by the high input-impedance follower amplifier $A_3$. This operates with a gain of 1, and dispatches its data to the differential amplifier $A_1$ input. When maximum is reached, an interruptor $I_1$ allows the store to be dumped, and a new measurement cycle begun.

Clearly, the storage devices in FIG. 4 (22 and 23) can consist of devices corresponding to the one shown in FIG. 6.

This device operates as follows.

The signal from the photo-receiver (16), which is proportional to the luminous flux reaching this photo-receiver, is amplified by the amplifier 20, the output signal from which is injected into the computer (21) and to each of the two devices 22 and 23. The storage device 22 supplies a signal corresponding to the maximum $M$ of the signal received from 20, to the amplifier 24 with a gain of 2, and also to the device 23, which produces a signal representing the difference between the signal from 22 and the minimum $m$ of the signal from 20. The differential amplifier 25 receives the signal with an amplitude of 2M from 24, and the signal with an amplitude of $(M - m)$ from 23, and produces a signal representing the difference between these signals, namely the sum $(M + m)$.

The signals from 23 and 25 are fed into the analogue divider (26), which produces an output signal representing the ratio $(M - m)/(M + m)$, in other words the factor of contrast. The signal from the analogue divider is sent to a display device 27 and/or printer.

This means that the value of the factor of contrast is available at any time during testing.

Naturally, the invention is in no way confined to the embodiments described and illustrated here : many alternative versions are possible for someone skilled in the art, depending on the applications involved and without there being any departure from the spirit of the invention.

In particular, the process according to the invention also enables to determine the transmittance T of the sample, also called transparency for the zero frequency, which is defined as the ratio expressed in per cent of the mean flux transmitted by the pattern in the presence of the sample to the mean flux transmitted by the pattern without any sample interposed.

This ratio can also be expressed by the equation $$T\% = [(M+m)s/(M+m)o] \times 100$$

where $(M+m)s$ is the sum of the maximum flux and of the minimum flux transmitted by the pattern when the sample is present and $(M+m)o$ is the sum of the maximum flux and of the minimum flux transmitted by the pattern without any sample interposed.

What is claimed is:

1. A process for measuring the transparency of a thin flat sample of material which process comprises the steps of
    directing a collimated beam of light from a slit through said sample,
    forming an image of said slit on a pattern whose transmission varies in a sinusoidal manner in a direction transversely of said beam, after said beam has passed through said sample, while moving said pattern in said direction transversely of said beam,
    receiving the light from said beam which passes through said pattern on a photo-cell to provide a sinusoidal output signal having an amplitude dependent on the quantity of said light being received, and
    processing said output signal to derive a factor of contrast proportional to $(M-m)/(M+m)$, where $M$ represents the maximum amplitude and m the minimum amplitude of said sinusoidal output, which factor is representative of the transparency of said sample.

2. A process according to claim 1 comprising measuring the mean light flux of said beam transmitted by the pattern in the presence of the sample and without any sample interposed, and deriving the ratio of the mean light flux transmitted in the presence of the sample to the mean light flux transmitted without any sample interposed to define the transmittance of the sample.

3. A process according to claim 1, in which the sample is submerged in a liquid with the same refractive index as said sample.

4. A process according to claim 1, in which the axis of symmetry of the sinusoidal pattern is at right angles to the said optical axis.

5. A process according to claim 1, in which the pattern has several spatial frequencies.

6. A process as claimed in claim 1 in which said sample is rotated in a plane transverse to the axis of said beam.

7. A process as claimed in claim 1 in which said sample is translated in a plane at right angles to the axis of said beam.

8. A process as claimed in claim 1 in which said sample is selected from the group consisting of liquids, glass, and plastic.

9. An apparatus for measuring the transparency of a sample of material, said apparatus comprising:
    a sample holder,
    a collimator provided with a slit and positioned to project a beam of parallel light from said slit into a sample in said holder,
    a movable light-transmitting pattern whose transmission varies in a sinusoidal manner in a direction transversely of said beam,
    means for moving said pattern in said transverse direction,
    an optical system positioned to form an image of said slit from the light of said beam which has passed through said sample onto said pattern,
    a photo-receiver positioned to receive the light from said beam which passes through said pattern, and provide a sinusoidal output signal having an amplitude which is dependent on the quantity of said light being received, and
    means for processing said output signal to derive a factor of contrast proportional to $(M-m)/(M+m)$, where M represents the maximum amplitude and m the minimum amplitude of said sinusoidal output, which factor is representative of the transparency of said sample.

10. An apparatus as claimed in claim 9 in which said sample holder contains a recess and said apparatus comprises means to rotate said holder and recess about an axis parallel to the optical axis of said beam.

11. An apparatus according to claim 10, in which the recess provided in the sample-holder to carry the sample is airtight, and contains a liquid with the same refractive index as the said sample.

12. An apparatus according to claim 9 in which said photoreceiver is a photo-diode and said processing means contains an amplifier combined with an analogue computer to derive the factor of contrast, said computer being connected to a display unit to transmit a signal indicative of said factor to said display unit.

13. An apparatus according to claim 9, in which the photo-receiver comprises a photomultiplier.

14. An apparatus according to claim 9 in which said processing means comprises:
- a first storage device receiving said input signal and supplying an output signal representing the maximum $M$ of said signal,
- a second storage device receiving both said input signal and the output signal from the first storage device and supplying an output signal representing the difference $(M-m)$ between the maximum and minimum of said input signal,
- an amplifier connected to double the output from said first storage device,
- a differential amplifier connected to receive both the output of said doubling amplifier and that of said second storage device, and to produce a difference signal equal to the difference therebetween, and
- an analog divider connected to receive both said difference signal and the output of said second storage device, and to produce an output signal equal to the quotient of the signals received thereby which represents the ratio $(M-m)/(M+m)$.

15. An apparatus as claimed in claim 14 in which each storage system comprises a first differential amplifier connected to load a capacity through a diode controlled by a high-impedance follower differential amplifier, and in which the output of said follower amplifier is connected to the input of said first differential amplifier.

16. An apparatus as claimed in claim 15 which comprises synchronization means for reducing the stored voltage to zero.

* * * * *